United States Patent
Costello et al.

(10) Patent No.: US 11,961,083 B2
(45) Date of Patent: Apr. 16, 2024

(54) ALERT CONTROLLER FOR LOSS PREVENTION

(71) Applicant: NCR Voyix Corporation, Atlanta, GA (US)

(72) Inventors: Christopher John Costello, Suwanee, GA (US); Gregory Scott Egan, Flowery Branch, GA (US)

(73) Assignee: NCR Voyix Corporation, Atlanta, GA (US)

( * ) Notice: Subject to any disclaimer, the term of this patent is extended or adjusted under 35 U.S.C. 154(b) by 214 days.

(21) Appl. No.: 15/949,917

(22) Filed: Apr. 10, 2018

(65) Prior Publication Data

US 2019/0311346 A1 Oct. 10, 2019

(51) Int. Cl.
*G06Q 20/40* (2012.01)
*G06K 7/14* (2006.01)
*G06Q 20/10* (2012.01)
*G06Q 20/18* (2012.01)
*G08B 13/14* (2006.01)

(52) U.S. Cl.
CPC ....... *G06Q 20/4016* (2013.01); *G06K 7/1413* (2013.01); *G06Q 20/18* (2013.01); *G08B 13/14* (2013.01); *G06Q 20/1085* (2013.01)

(58) Field of Classification Search
CPC .................................................. G07G 3/003
See application file for complete search history.

(56) References Cited

U.S. PATENT DOCUMENTS

| | | | | |
|---|---|---|---|---|
| 6,354,498 B1 * | 3/2002 | Lutz | ..................... | G07G 1/0054 186/52 |
| 6,788,205 B1 * | 9/2004 | Mason | ..................... | A47F 9/047 235/383 |
| 6,809,645 B1 * | 10/2004 | Mason | ................. | G08B 13/246 235/385 |
| 7,980,464 B1 * | 7/2011 | Sarris | ..................... | G07F 7/1016 235/379 |
| 9,734,663 B2 * | 8/2017 | Chun | ................. | G06Q 20/4016 |
| 2008/0226129 A1 * | 9/2008 | Kundu | ................. | G07G 1/0036 382/103 |
| 2011/0295704 A1 * | 12/2011 | Edwards | ................ | G06Q 30/06 705/16 |
| 2012/0158529 A1 * | 6/2012 | Edwards | .............. | G06Q 20/208 705/16 |

(Continued)

*Primary Examiner* — Lynda Jasmin
*Assistant Examiner* — Kimberly S. Bursum
(74) *Attorney, Agent, or Firm* — Schwegman Lundberg & Woessner, P.A.

(57) ABSTRACT

Item images and item information for an item identified as being associated with a potential theft during a transaction at a transaction terminal are sent in real time to an alert controller of a management terminal. The item images and item information with transaction details are presented on a display for resolution by a clerk operating the management terminal. A timer is also set and a confidence score calculated representing a confidence level that the item is the subject of theft. When the timer expires and there is still no resolution provided by the clerk a decision is made as to whether to interrupt the transaction processing on the transaction terminal for assistance or whether to permit the transaction to complete on the transaction terminal based on the calculated confidence score.

17 Claims, 4 Drawing Sheets

(56) References Cited

U.S. PATENT DOCUMENTS

| | | | | |
|---|---|---|---|---|
| 2012/0271712 | A1* | 10/2012 | Katzin | G06Q 20/20 |
| | | | | 705/14.51 |
| 2012/0321146 | A1* | 12/2012 | Kundu | G06Q 20/208 |
| | | | | 340/568.8 |
| 2013/0313316 | A1* | 11/2013 | Jones | G06Q 20/204 |
| | | | | 235/383 |
| 2014/0063262 | A1* | 3/2014 | Edwards | G06Q 30/018 |
| | | | | 348/159 |
| 2014/0217172 | A1* | 8/2014 | McCauley | G06Q 20/40145 |
| | | | | 235/383 |
| 2015/0208043 | A1* | 7/2015 | Lee | G06Q 10/06311 |
| | | | | 348/150 |
| 2016/0027102 | A1* | 1/2016 | Smith | G06Q 40/00 |
| | | | | 705/35 |
| 2016/0292963 | A1* | 10/2016 | Chun | G06Q 20/1085 |
| 2016/0350738 | A1* | 12/2016 | Crooks | G06K 9/00771 |
| 2018/0096567 | A1* | 4/2018 | Farrow | G06V 40/161 |
| 2019/0122492 | A1* | 4/2019 | Nguyen | G07F 17/3248 |

* cited by examiner

ALERT CONTROLLER FOR LOSS PREVENTION

BACKGROUND

Increasingly, retailers are encouraging customers to utilize self-checkout mechanisms to checkout with goods and services of the retailers. Self-Service Terminals (SSTs) are particularly popular in grocery stores where customers can self-checkout with their groceries. This improves checkout throughput, reduces queues at checkout stations, and reduces staffing needs of the retailer.

However, with the benefits of SSTs comes associated risks attributed to customer theft. For example, a customer can replace a more expensive barcode of an item with a barcode of a less expensive item and attempt to checkout by scanning the barcode of the less expensive item. A customer can also cover the barcode of an item or obscure the barcode from the line-of-sight of the scanner of the SST, while making it appear to onlookers that the customer scanned the item during checkout. In still another case, the customer can enter a code for a produce item that does not match the actual produce being purchased by the customer (such as failing to identify an organic produce item, which is more expensive than a corresponding non-organic produce item). Each of these examples results in a financial loss to the retailers.

The problem is not limited to SSTs, an employee of the retailer can perform the same types of theft when checking out a customer (who may be a friend or relative of the employee) at a Point-Of-Sale (POS) terminal (customer-assisted checkout terminal).

As a result, retailers have deployed a variety of theft prevention mechanisms at both the SSTs and the POS terminals. These are automated approaches that stop a transaction from completing and forces manual intervention to successfully complete the transaction when a potential loss is detected.

These automated approaches also come at a cost to the retailers when false positives are reported. False positives delay customer checkout throughput, resulting in longer checkout queues, and chagrinned customers; some of which may put their items back in the store and leave without making a purchase. Even more costly to the retailer is when customers feel that they are being unfairly treated or targeted as a thief when manual intervention is required, such customers may never frequent the retailer again.

Furthermore, true thieves are keenly aware of security mechanisms put into place by retailers. Consequently, as more false positives are handled by the retailers, the less likely that thieves are going to even attempt to steal from the retailer. This means that the false positives are almost exclusively detected for honest and loyal customers of the retailers, and the false positive rate experienced by the retailers increases substantially over time, such that nearly all theft detection is a false positive.

As a result, retailers have either turned off their theft-prevention mechanisms during high-customer traffic times or have reduced the threshold of detection by the mechanisms so substantially that the mechanisms are effectively turned off.

It appears that although technology exists for loss prevention, the financial costs to the retailers in handling false positives now outweigh the costs of the actual theft.

SUMMARY

In various embodiments, methods and a system are provided for alert processing of theft prevention.

According to an embodiment, a method for alert processing of theft prevention is provided. Specially, and in an embodiment, item information is received from a transaction terminal during a transaction at the transaction terminal. The item information is presented on a display of a management terminal. A timer is set and a confidence score is calculated for the item information, the confidence score is a confidence that the item information is directed to a potential theft occurring with the transaction. The transaction processing on the transaction terminal is interrupted when the item information is unresolved after the timer expires and the confidence score exceeds a threshold value, otherwise permitting the transaction to complete at the transaction terminal.

DETAILED DESCRIPTION

Figure 1:
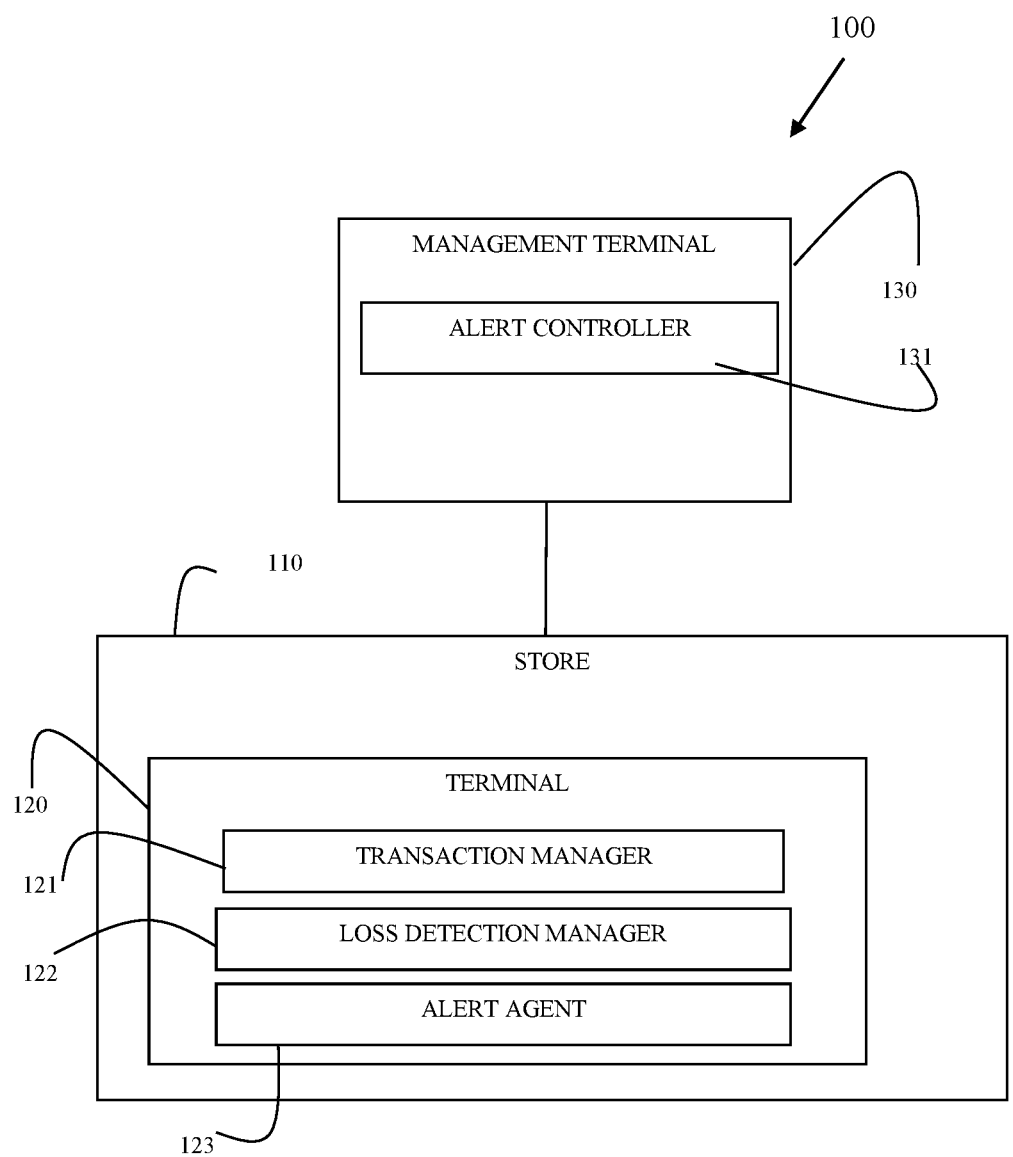
FIG. 1 is a diagram of alert processing system 100, according to an example embodiment.

FIG. 1 is a diagram illustrating components of an alert system 100, according to an example embodiment. It is to be noted that the system 100 is shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of real-time alert processing of theft prevention, presented herein and below.

Furthermore, the techniques and the systems presented herein and below (for real-time alert processing of theft prevention) may include all or some combination of the components shown with the system 100. The methods are programmed as executable instructions in memory and/or non-transitory computer-readable storage media and executed on one or more processors associated with the components/devices.

Specifically, the system 100 includes a store 100 that includes a plurality of transaction terminals 120 (only one illustrated in the FIG. 1 but it is to be noted that a plurality of transaction terminals 120 can be present). Each terminal 120 includes one or more processors, memory, and non-transitory computer-readable storage. The processors of each terminal execute computer instructions representing a transaction manager 121, a loss detection manager 122, and an alert agent 123. The terminal 120 also includes network circuitry for connecting and communication with a remote management terminal 130 over a network connection. The management terminal 130 includes a processor, memory, and non-transitory computer-readable storage. The management terminal's processor executes computer instructions representing an alert controller 131. The management terminal 130 also includes a display and other software that manages each terminal 120.

A checkout transaction at the terminal 120 is processed by the transaction manager 120. Typically, a customer or cashier scans the barcodes of items being purchased by orienting the barcodes within a line-of-sight of a scanner. The transaction manager 121 looks up the item and price information and maintains transaction details for the transaction. The transaction manager 121 also provides a variety of other functions while processing the transaction, such as but not limited to: item lookup (when I item is an item without a barcode (such as produce)), transaction payment, loyalty processing, coupon processing, etc.

The loss detection manager 122 interacts with the transaction manager to interrupt a transaction during which a potential theft is detected. This can be based on a variety of factors, such as detection of an item passing within the line-of-sight of the scanner for which no barcode was read (referred to as scan avoidance), image processing for an image captured for the item that does not match the expected shape, dimensions, and/or color of an item associated with the scanned barcode (referred to as scan substitution), and image processing for an image of a capture item where the entered code for identifying the item does not match a template of characteristics associated with an item linked to the entered code (referred to as produce assurance).

Each of scan avoidance, scan substitution, and produce/item assurance may uses a variety of processing factors to identify when during a transaction that potential theft is present. For example, the scan avoidance detects an image of an unknown object that is passed in front of the scanner or another camera situated at the terminal 120 while noting that the transaction manager 121 did not record item price information before a next item is successfully scanned for the transaction or before the transaction is indicated as being complete and ready for payment. The barcode substitution and the product assurance can process image characteristics such, as shape, size, dimensions, and color of the item passing in the field of view of the scanner or a camera that does not match a template for an expected item of the barcode scanned or an expected item for a product code entered.

Typically, when scan avoidance, barcode substitution, or product assurance is detected, an interrupt is generated and a clerk or manager is dispatched to the manually inspect the transaction. The transaction manager 121 is provided an interrupt message and the transaction suspends until a manual override by a clerk is entered for the transaction to continue. It is to be noted that this is but one processing scenario of many during which a potential theft situation is detected by the loss detection manager 122 and the resulting process flow for continuing with the transaction and is presented for illustrative purposes only.

Rather than suspending the transaction and interrupting the transaction manager 121, the alert agent 123 sends the information that the loss detection manager 122 collected for the potential theft situation, such as images of the item, video of the scan avoidance, and any entered or scanned barcode information to alert controller 131 on the management terminal 130. Any clerk that is available at the management terminal 131 is provided the transaction details, a terminal identifier for the terminal 120, and the image and text information collected for the potential loss. This is displayed on a display of the management terminal 130 in real time to the clerk for inspection. For example, the clerk can see an image of a product captured with the suspected transaction item and see an image of the actual product that was scanned with the barcode. The clerk can also see a short video clip of any item that is believed to have not been scanned for the transaction. This real-time information is provided by the alert agent 123 to the alert controller 131 in near real time. The clerk at the management terminal makes a real-time decision as to whether the potential theft is legitimate or a false positive and can provide a direct override back to the transaction manager 121 to continue with transaction processing for any false positive or can dispatch someone to the transaction terminal 120 to manually address situations that are believed to be a theft scenario.

During the time it takes the clerk to inspect the image and text information for a potential theft situation, the transaction manager 121 can be configured to slow down the transaction, ask questions of the customer, provide some advertisements, or simply indicate through a message presented on the display of the transaction terminal 120 that item pricing information does not match and a lookup is occurring so be patient for a few seconds. Such processing to intentionally delay transaction processing may occur when the customer indicates through a transaction interface on the transaction terminal 120 that the customer is done and ready to pay for the transaction. This will not alert the customer to the processing being performed simultaneously with the alert controller 131. The delay can also be enforced when the clerk has not decided whether there is a theft and the customer has started payment processing by a card swiped in a card reader of the transaction terminal 120. Here, the card information is held in abeyance and not processed with the credit card financial institution until the clerk has made a decision for the potential theft.

In fact, a variety of other mechanism that intentionally slows down the transaction manager's processing of the transaction or the payment can be instituted in manners that are obfuscated from the customer. In this way, the customer is unaware that the loss detection manager 122 has flagged one or more items in the customer's transaction as being associated with potential theft while in real time a remote clerk operating the management terminal 130 is reviewing the specific images, videos, and text information (transaction details) remotely.

For example, suppose a customer while operating the transaction terminal moved a purse or handbag past the scanner or camera during the transaction and then continued to scan remaining items of the transaction. The loss detection manager 122 identifies a scan avoidance and the alert agent 123 sends a video clip of the purse being moved in front of the scanner or camera as soon as a first of the remaining items being scanned is successfully scanned. The transaction continues unabated and the clerk is presented the video clip by the alert controller 131. The clerk quickly recognizes that there was no theft and sends a real-time override to the loss detection manager 122, which then does not interrupt the transaction manager 121 and the transaction continues to completion (payment and receipt). If the clerk was not responsive in reviewing the video clip or was distracted with another transaction, then before or after the customer provides payment, the alert agent 122 initiates processing of the transaction manager 121 to display a few items that are on sale asking if the customer is interested in any of them, so as to give the clerk more time to respond.

The alert controller 131 also sets a timer as soon as the potential theft information is provided on the management terminal 130 to the clerk (through the display of the management terminal 130). The time is configurable based on policy, such that the timer is longer when customer traffic at the transaction terminals 120 is light and shorter when customer traffic at the terminals 120 is heavy. While the timer is running, the alert controller 131 is configured to evaluate a number of factors, such as price of the item, item description, customer loyalty (customer name and loyalty level), day of week, time of day, calendar date, and others. These factors are custom weighted and scored to produce a score, which is then compared to a threshold value. When the score exceeds the threshold value and the timer elapses (expires), the alert controller 131 instructs the loss detection manager 122 (through the agent 123) to interrupt the transaction processing and dispatch manual intervention. When the score is less than the threshold and the timer elapses (expires), the alert controller 131 instructs the loss detection manager 122 (through the agent 123) to not interrupt the transaction manager 121 and let the transaction complete uninterrupted. The factors, the policy, and the threshold can be set by the enterprise based on experience and accuracy of the loss detection manager 122.

In an embodiment, scoring (weighting algorithm) and the threshold can be dynamically adjusted through a machine-learning process for which the outcomes in given situations of potential loss with manual intervention are provided to the machine-learning process. In fact, any subsequent factors discovered as being relevant can be fed to or discovered by the machine-learning process.

The score processed during the timer by the alert controller 131 is a confidence value that the potential theft situation for an item is a legitimate or true theft versus a possible oversight.

The system 100 provides a mechanism for substantially reducing false positives associated with potential theft during a transaction at a transaction terminal 120. This is done without modifying an existing theft prevention processing that executes on the transaction terminal 120 and can account for unresolved transaction items believed to be associated with theft that are unaddressed at the expiration of a timer. As a result, the accuracy of existing theft prevention measures is substantially improved and false positives are substantially reduced or eliminated.

In an embodiment, the transaction terminal is one of: a SST, an Automated Teller Machine (ATM), a tablet, a laptop, a desktop computer, a phone, a wearable processing device, a kiosk, and a POS terminal.

In an embodiment, the management terminal 130 is interfaced to a server having the agent controller 131. In an embodiment, the server is a cloud processing environment.

In an embodiment, a plurality of management terminals 130 are present, with each management terminal being responsible for assisting and monitoring transaction on a given set of transaction terminals 120.

In an embodiment, the processing associated with the alert controller 131 can be subsumed and processed entirely on the transaction terminal 120.

The above-discussed embodiments and other embodiments are now discussed with reference to the FIGS. 2-4.

Figure 2:
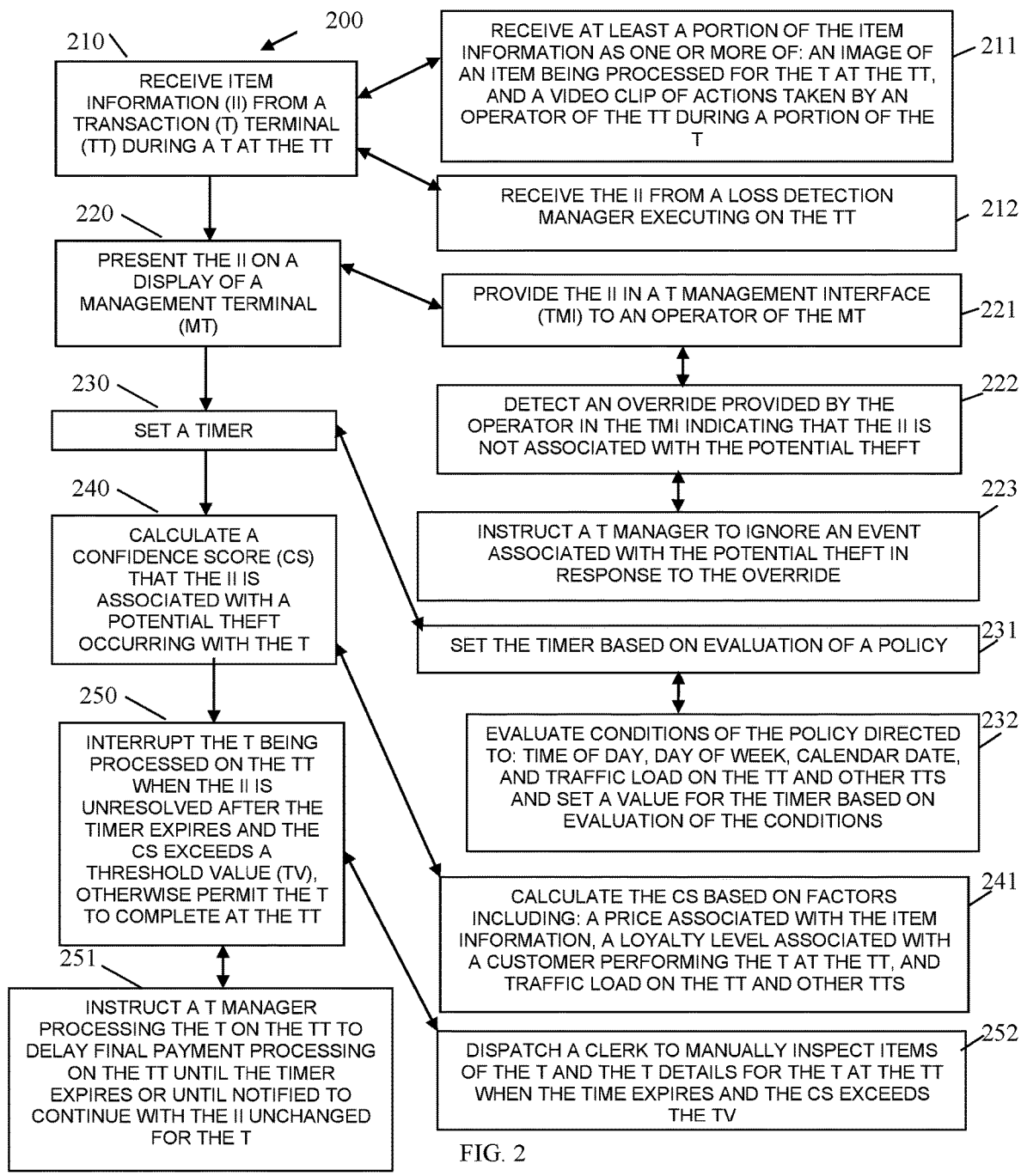
FIG. 2 is a diagram of a method for alert processing of theft prevention, according to an example embodiment.

FIG. 2 is a diagram of a method 200 for alert processing of theft prevention, according to an example embodiment. The software module(s) that implements the method 200 is referred to as an "alert controller." The alert controller is implemented as executable instructions programmed and residing within memory and/or a non-transitory computer-readable (processor-readable) storage medium and executed by one or more processors of a device. The processor(s) of the device that executes the alert controller are integrated with one or more image sensors/cameras and are specifically designed, configured, and programmed to process the alert controller. The alert controller may have access to a network during its processing. The network can be wired, wireless, or a combination of wired and wireless.

In an embodiment, the device that executes the alert controller is the management terminal 130.

In an embodiment, the device that executes the alert controller is a server.

In an embodiment, the device that executes the alert controller is a cloud processing environment.

In an embodiment, the device that executes the alert controller is the transaction terminal 120.

In an embodiment, the alert controller is the alert controller 131.

At 210, the alert controller receives item information from a transaction terminal during a transaction that is being processed by a transaction manager at the transaction terminal.

According to an embodiment, at 211, the alert controller receives at least a portion of the item information as one or more of: an image of an item being processed for the transaction at the transaction terminal, and a video clip of actions taken by an operator of the transaction during a portion of the transaction.

In an embodiment, at 212, the alert controller receives the item information from a loss detection manager. In an embodiment, the loss detection manager is the loss detection manager 122. In an embodiment, the loss detection manager provides the item information as being relevant to a detected potential theft event during the transaction for one or more of: scan avoidance, barcode substitution, and produce or item assurance.

At 220, the alert controller presents the item information on a display of a management terminal being operated by a clerk that is monitoring in real time the transaction terminal and, in some cases, multiple other transaction terminals.

In an embodiment, at 221, the alert controller provides the item information as populated data in a transaction management interface for review and interaction by an operator (clerk) of the management terminal.

In an embodiment of 221 and at 222, the alert controller detects an override provided by the operator in the transaction management interface that indicates that the item information is not associated with the potential theft.

In an embodiment of 222 and at 223, the alert controller instructs a transaction manager processing the transaction on the transaction terminal to ignore an event associated with the potential theft in response to the detected override provided in the transaction management interface.

Simultaneous to 220, and at 230, the alert controller sets a timer.

In an embodiment, at 231, the alert controller sets the timer based on evaluation of a custom policy.

In an embodiment of 231 and at 232, the alert controller evaluates conditions of the policy that are directed to one or more of: current time of day, current day of week, current calendar date, and traffic load on the transaction terminal and other transaction terminals. The alert controller sets a value for the time based on evaluation of the conditions.

At 240, the alert controller calculates a confidence score representing a confidence value that the item information is associated with potential theft occurring with the transaction at the transaction terminal.

In an embodiment, at 241, the alert controller calculates the confidence value based on factors including one or more of: a price associated with the item information, a loyalty level associated with a customer performing the transaction at the transaction terminal, and a traffic load on the transaction terminals and other transaction terminals.

At 250, the alert controller interrupts the transaction being processed on the transaction terminal when the item information is unresolved after the timer expires and the confidence score exceeds a threshold value; otherwise, the alert controller provides an indication that permits the transaction to complete at the transaction terminal.

According to an embodiment, at 251, the alert controller instructs a transaction manager that is processing the transaction on the transaction terminal to delay final payment processing for the transaction on the transaction terminal until the time expires or until notified to continue with the item information unchanged for the transaction.

Figure 3:
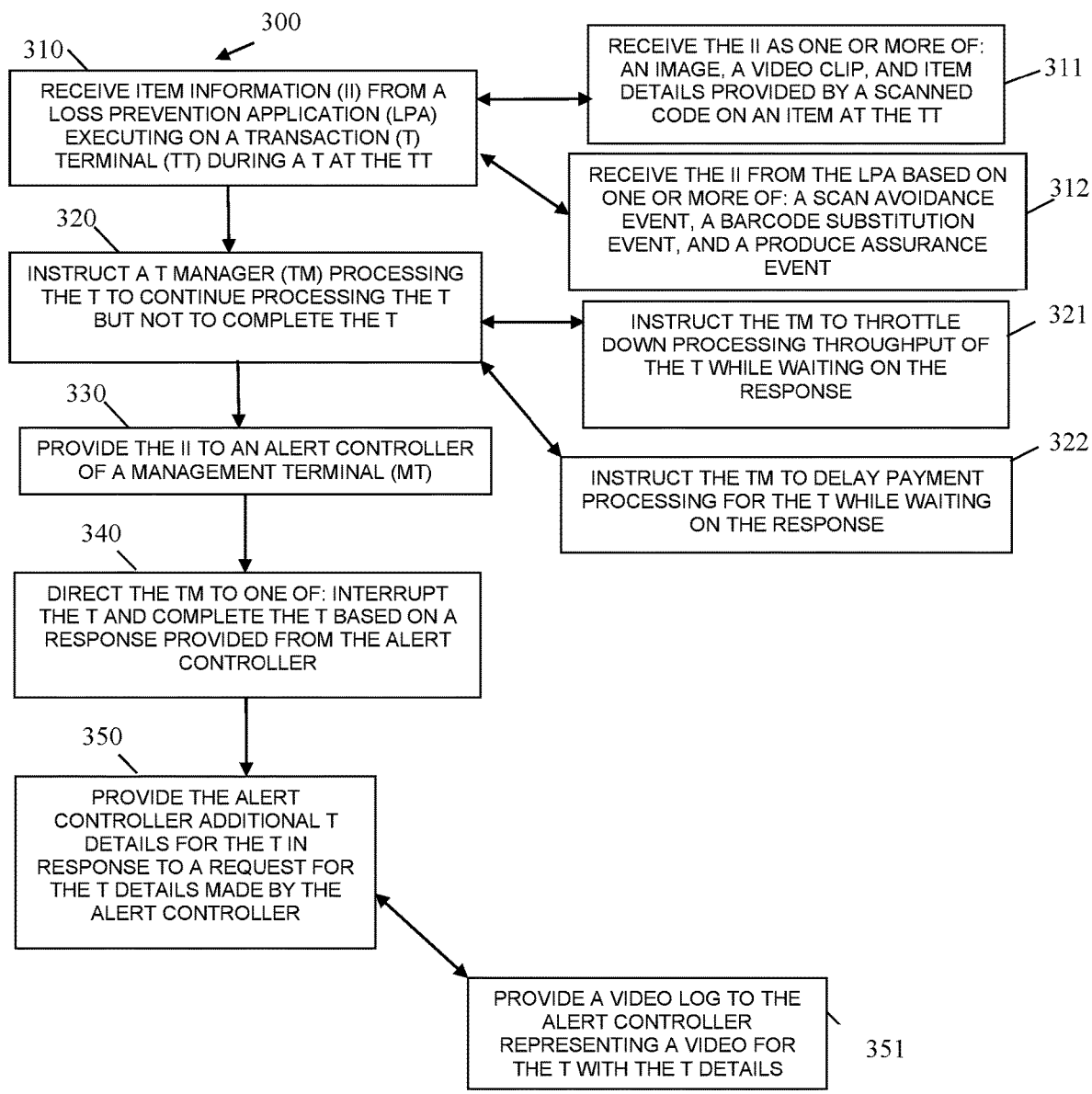
FIG. 3 is a diagram of another method for alert processing of theft prevention, according to an example embodiment.

FIG. 3 is a diagram of another method 300 for alert processing of theft prevention, according to an example embodiment. The software module(s) that implements the method 300 is referred to as an "alert agent." The alert agent is implemented as executable instructions programmed and residing within memory and/or a non-transitory computer-readable (processor-readable) storage medium and executed by one or more processors of a hardware device. The hardware processors that execute the alert agent include are specifically configured and programmed to process the alert agent. The alert agent may have access to one or more networks during its processing. Each network can be wired, wireless, or a combination of wired and wireless.

The alert agent interacts with the alert controller 131 and/or the method 200.

In an embodiment, the device that executes the alert agent is the transaction terminal 120. In an embodiment, the transaction terminal 120 is one of: a SST, an ATM, a kiosk, a POS terminal, a phone, a tablet, a laptop, a desktop computer, and a wearable processing device.

In an embodiment, the alert agent is the alert agent 123.

At 310, the alert agent receives item information from a loss prevention application that is executing on a transaction terminal during a transaction at the transaction terminal. In an embodiment, the loss prevention application is the loss prevention manager 122.

In an embodiment, at 311, the alert agent receives the item information as one or more of: an image, a video clip, and item details provided by a scanned code on an item at the transaction terminal.

At 320, the alert agent instructs a transaction manager that is processing the transaction on the transaction terminal to continue processing the transaction but not to complete the transaction.

In an embodiment, at 321, the alert agent instructs the transaction manager to throttle down processing throughput of the transaction while waiting on a response.

In an embodiment, at 322, the alert agent instructs the transaction manager to delay payment processing for the transaction while waiting on a response.

In an embodiment, the transaction manager is the transaction manager 121.

At 330, the alert agent provides the item information to an alert controller of a management terminal. In an embodiment, the management terminal is the management terminal 130. In an embodiment, the alert controller is one of: the alert controller 131 and the method 200.

At 340, the alert agent directs the transaction manager to one of: interrupt the transaction processing, and complete the transaction processing based on a response received from the alert controller.

According to an embodiment, at 350, the alert agent provides the alert controller additional transaction details for the transaction in response to a request for the transaction details made by the alert controller.

In an embodiment of 350 and at 351, the alert agent provides a video log to the alert controller representing a video for the entire transaction with the transaction details. This can be used for as an audit trail and in providing feedback/training to a machine-learning algorithm when it was determined that there was a potential theft along with the subsequent outcome (was this a false positive or a legitimate theft situation), such that the video log can be evaluated to alter factors or weights of factors accordingly in the machine-learning algorithm.

Figure 4:
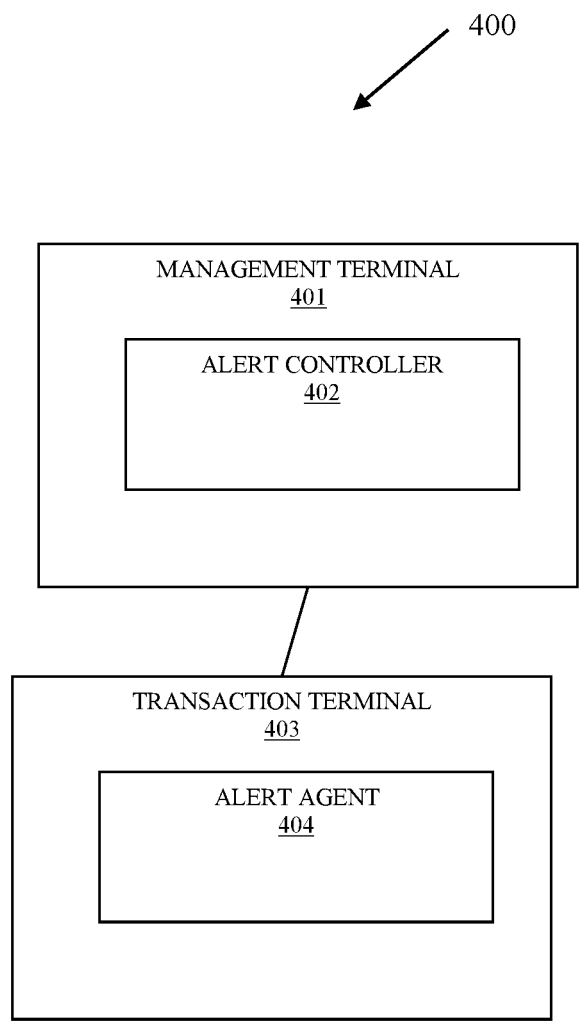
FIG. 4 is a diagram of another system for alert processing of theft prevention, according to an example embodiment.

FIG. 4 is a diagram of another system 400 for alert processing of theft prevention, according to an example embodiment. Some components of the system 400 are programmed and reside within memory and/or a non-transitory computer-readable medium and execute on one or more processors of multiple devices of the system 400. The system 400 communicates over one or more networks, which can be wired, wireless, or a combination of wired and wireless.

In an embodiment, the system 400 is the system 100.

In an embodiment, the system 400 implements, among other things, the processing discussed in the FIGS. 1-3.

The system 400 includes a management terminal 401 having an alert controller 402 and a transaction terminal 403 having an alert agent 404.

In an embodiment, the management terminal 401 is the management terminal 130. In an embodiment, the management terminal 130 is a server. In an embodiment, the management terminal 130 is a cloud processing environment.

In an embodiment, the alert controller 402 is all of or some combination of: the alert controller 131 and/or the method 200.

In an embodiment, the transaction terminal 403 is the transaction terminal 120. In an embodiment, the transaction terminal 120 is one of: a desktop computer, a SST, a kiosk, an ATM, a POS terminal, a tablet, a laptop, a phone, and a wearable processing device.

In an embodiment, the alert agent 404 is all or some combination of: the alert agent 123 and/or the method 300.

The alert controller 402 is represented as executable instructions processed on one more processors of the management terminal 401, and the alert controller 402 is configured to: i) receive item information during a transaction at the transaction terminal 403 from a theft prevention application, ii) send the item information in real time and during the transaction to the alert controller 402, iii) instruct a transaction manager that processes the transaction to delay transaction processing to prevent completion of processing of the item information by the alert controller 402, and iv) instruct the transaction manager to one of: interrupt and suspend the transaction for intervention and continue with completion of the transaction based on a response received from the alert controller 402.

The alert agent 404 is represented as executable instructions processed on one or more processors of the transaction terminal 403, and the alert agent 404 is configured to: a) present the item information within a transaction interface on a display of the management terminal 401, b) set a timer, c) calculate a confidence value from the item information, d) send an interrupt response as the response to the alert agent when: an override is not received within the transaction interface, the timer expires, and the confidence value exceeds a threshold value, and e) send a continue response as the response to the alert agent 404 when one of: the override is received before the timer expires and the confidence value is below the threshold value with the timer expired.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving item information from a transaction terminal during a transaction at the transaction terminal, wherein receiving further includes receiving images captured for items at the transaction terminal, entered or scanned barcode information captured for the items at the transaction terminal, and a video clip of any item not associated with a scan at the transaction terminal;
presenting the item information on a display of a management terminal;
setting a timer based on customer traffic, wherein setting the timer to be shorter when customer traffic is heavy and setting the timer to be longer when the customer traffic is lighter;
calculating a confidence score that the item information is associated with a potential theft occurring with the transaction;
interrupting the transaction being processed on the transaction terminal based on a customer associated with the transaction indicating that the customer is done and ready to pay for the transaction and further determined by identifying a card swiped in a card reader of the transaction terminal indicating that the customer has started payment processing, and wherein interrupting further includes preventing the transaction from completing at the transaction terminal by holding card information associated with the card swiped in the card reader in abeyance by not providing the card information to and not processing the card information with a corresponding financial institution until the calculating has finished calculating the confidence score and the confidence score is below a threshold value, otherwise preventing the transaction from completing at the transaction terminal as an indication that the timer expired with the confidence score exceeding the threshold value, wherein interrupting further includes slowing down the transaction while the calculating has not finished calculating the confidence score and during a transaction slow down engaging the customer in questions and obfuscating from the customer that the item information is being evaluated for potential theft during the transaction slow down to intentionally delay completion of the transaction until the confidence score is calculated; and
sending a remote override to the transaction terminal from the management terminal that permits the transaction to proceed and removing the interrupting when an operator of the management terminal reviews the video clip and concludes there is no potential theft, wherein the video clip includes a certain image of a certain item displayed with transaction details for the transaction and a terminal identifier for the transaction terminal on the management terminal to the operator.

2. The method of claim 1, wherein receiving further includes receiving the item information from a loss detection manager executing on the transaction terminal.

3. The method of claim 1, wherein presenting further includes providing the item information in a transaction management interface to the operator of the management terminal.

4. The method of claim 3, wherein providing further includes detecting the remote override provided by the operator in the transaction management interface to the transaction terminal, the remote override indicating to the transaction terminal that the item information is not associated with the potential theft.

5. The method of claim 4, wherein detecting further includes instructing a transaction manager to ignore an event associated with the potential theft in response to the override.

6. The method of claim 1, wherein setting further includes setting the timer based on evaluation of a policy.

7. The method of claim 6, wherein setting further includes evaluating conditions of the policy directed to: time of day, day of week, calendar date, and traffic load on the transaction terminal and other transaction terminals and setting a value for the timer based on evaluation of the conditions.

8. The method of claim 1, wherein calculating further includes calculating the confidence score based on factors including: a price associated with the item information, a loyalty level associated with the customer performing the transaction at the transaction terminal, and traffic load on the transaction terminal and other transaction terminals.

9. The method of claim 1, wherein interrupting further includes instructing a transaction manager processing the transaction on the transaction terminal to delay final payment processing on the transaction terminal until the timer expires.

10. The method of claim 1, wherein interrupting further includes dispatching a clerk to manually inspect the items of the transaction and the transaction details for the transaction at the transaction terminal when the timer expires and the confidence score exceeds the threshold value.

11. A method, comprising:
receiving item information from a loss prevention application executing on a transaction terminal during a transaction at the transaction terminal, wherein receiving further includes receiving the item information as an image, a video clip, and item details provided by a scanned code on an item at the transaction terminal;
instructing a transaction manager processing the transaction to continue processing the transaction without completing the transaction based on identifying that a customer has started payment processing by detecting a card swiped in a card reader of the transaction terminal, and wherein instructing further includes preventing the transaction from completing at the transaction terminal by holding card information associated with the card swiped in the card reader in abeyance and by not providing the card information to and not processing the card information with a corresponding financial institution and intentionally slowing down the transaction and obfuscating from the customer that the item information is being evaluated for potential theft during the slowing down of the transaction;

providing the item information to an alert controller of a management terminal, wherein the providing further includes causing the transaction manager to engage the customer at the transaction terminal in questions during the slowing down of the transaction to intentionally delay completion of the transaction or intentionally suspend the transaction until a response is received from the alert controller, wherein a length of time that the transaction is slowed down is dependent upon a time set by the alert controller;

directing the transaction manager to perform processing comprising interrupting the transaction preventing completion of the transaction when theft is detected by the alert controller and completing the transaction based on the response provided from the alert controller indicating that theft is not detected by providing the card information to the corresponding financial institution to complete the transaction; and instructing the transaction manager to permit the transaction to complete by supplying the transaction manager an override sent by an operator of the management terminal when the operator of the management terminal after reviewing the video clip concludes that there was no theft for the transaction, wherein the video clip includes a certain image of a certain item displayed with transaction details for the transaction and a terminal identifier for the transaction terminal on the management terminal to the operator.

12. The method of claim 11, wherein receiving further includes receiving the item information from the loss prevention application based on one or more of: a scan avoidance event, a barcode substitution event, and a produce assurance event.

13. The method of claim 11, wherein instructing further includes instructing the transaction manager to delay payment processing for the transaction while waiting on the response.

14. The method of claim 11 further comprising, providing the alert controller the transaction details for the transaction in response to a request for the transaction details made by the alert controller.

15. The method of claim 14, wherein providing further includes providing a video log to the alert controller representing a video for the transaction with the transaction details.

16. A system, comprising:
a management terminal having a hardware processor that executes computer instructions representing an alert controller; and
a transaction terminal having a hardware processor that executes computer instructions representing an alert agent;
wherein the alert agent when executed by the hardware processor is configured to perform processing comprising:

receiving item information during a transaction at the transaction terminal from a theft prevention application, wherein receiving further includes receiving the item information as an image, a video clip, and item details provided by a scanned code on an item at the transaction terminal;

sending the item information in real time and during the transaction to the alert controller;

instructing a transaction manager that processes the transaction to slow down transaction processing to prevent completion of processing of the item information based on a customer associated with the transaction indicating that the customer is done and ready to pay for the transaction by identifying that the customer has started payment processing by identifying a card swiped in a card reader of the transaction terminal, and wherein instructing further includes preventing the transaction from completing at the transaction terminal by holding card information associated with the card swiped in the card reader in abeyance by not providing the card information to and not processing the card information with a corresponding financial institution and engaging the customer at the transaction terminal in questions while obfuscating from the customer that the item information is being evaluated for potential theft during a transaction slow down until a response is received from the alert controller; and instructing the transaction manager to perform processing comprising:
interrupting and suspending the transaction for intervention or completing the transaction based on the response received from the alert controller by providing the card information to the corresponding financial institution;

wherein the alert controller when executed by the hardware processor is configured to perform processing comprising:
presenting the item information within a transaction interface on a display of the management terminal;
setting a timer based on customer traffic, wherein setting the timer to be shorter when customer traffic is heavy and setting the timer to be longer when the customer traffic is lighter;
calculating a confidence value from the item information;
sending an interrupt response as the response to the alert agent when:
an override is not received within the transaction interface, the timer expires, and the confidence value exceeds a threshold value; and
sending a continue response as the response to the alert agent when:
the override is received before the timer expires and the confidence value is below the threshold value, wherein the override received is provided by an operator of the management terminal to the transaction manager as an indication that the operator reviewed the video clip and concluded there was no theft for the transaction, wherein the video clip includes a certain image of a certain item displayed with transaction details for the transaction and a terminal identifier for the transaction terminal on the management terminal to the operator.

17. The system of claim 16, wherein the transaction terminal is one of: a Self-Service Terminal (SST), an Automated Teller Machine (ATM), a kiosk, and a Point-Of-Sale (POS) terminal.

* * * * *